United States Patent [19]
Kim

[11] Patent Number: 5,909,035
[45] Date of Patent: Jun. 1, 1999

[54] THIN FILM TRANSISTOR ARRAY HAVING A STATIC ELECTRICITY PREVENTING CIRCUIT

[75] Inventor: Jeom Jae Kim, Seoul, Rep. of Korea

[73] Assignee: LG Electronics, Seoul, Rep. of Korea

[21] Appl. No.: 08/908,955

[22] Filed: Aug. 8, 1997

[30] Foreign Application Priority Data

Jan. 10, 1997 [KR] Rep. of Korea ................. 97-00459

[51] Int. Cl.$^6$ .................. H01L 29/04; H01L 31/036; H01L 31/0376
[52] U.S. Cl. ............. 257/59; 257/72; 257/350; 349/139; 349/140; 349/149; 349/152
[58] Field of Search ............. 257/59, 72, 350; 349/139, 140, 149, 152

[56] References Cited

U.S. PATENT DOCUMENTS

| | | | |
|---|---|---|---|
| 5,068,748 | 11/1991 | Ukai et al. .......................... | 359/59 |
| 5,497,146 | 3/1996 | Hebiguchi ..................... | 340/825.91 |
| 5,504,348 | 4/1996 | Yoshida et al. . | |
| 5,668,032 | 9/1997 | Holmberg et al. ................. | 438/144 |
| 5,798,534 | 8/1998 | Young ................................. | 257/59 |

*Primary Examiner*—Ngân V. Ngô

[57] ABSTRACT

A thin film transistor array and method of manufacture includes a substrate, a plurality of scanning lines formed in a first direction on the substrate, a plurality of data lines formed in a second direction on the substrate such that each data line crosses the scanning lines, a pixel electrode formed at each cross-over portion between the scanning and data lines, and a thin film transistor also formed at each cross-over portion. Each thin film transistor has an input electrode connected to one of the data lines, an output electrode connected to the pixel electrode formed at the cross-over portion, and a control electrode connected to one of the scanning lines. The array further includes a gate short line, which receives a scanning voltage applied to the scanning lines, and a data short line, which receives a first voltage. A first static electricity prevention circuit is associated with each scanning line, and is connected between the associated scanning line and the gate short line. A second static electricity prevention circuit is associated with each data line, and is connected between the associated data line and the data short line.

34 Claims, 5 Drawing Sheets

THIN FILM TRANSISTOR ARRAY HAVING A STATIC ELECTRICITY PREVENTING CIRCUIT

BACKGROUND OF THE INVENTION

1. Field of the Invention

The present invention relates to a thin film transistor array in a liquid crystal panel having a static electricity preventing circuit.

2. Description of Related Art

Among display devices, a Cathode Ray Tube (CRT) is widely used to enhance color realization. The CRT is suitable as a display device incorporated in a TV or a computer monitor because of its high response time. However, since a CRT requires a predetermined distance between an electron gun and a screen, it is relatively thick and heavy. CRTs also have high power consumption. These factors make CRTs unsuitable as portable display devices.

In order to overcome the limitations of CRTs, many simplified display devices have been suggested. Of these suggestions, the liquid crystal display (LCD) is the most practical and has the widest range of applications.

Compared to the CRT, a conventional liquid crystal display has a darker picture and a slower response time. An LCD, however, does not require an electron gun type of a mechanism, and pixels are selectively operated by a driving circuit. Because an LCD is so thin, it is also suitable as a wall type display. Further, an LCD's light weight allows it to be used in a battery operated notebook computer, or in other portable display systems.

FIG. 1 shows the structure of a general liquid crystal display. As shown in FIG. 1, the liquid crystal display includes a display region 12 and data and gate driver ICs 10 and 11 for generating image signals.

FIG. 2 shows a more detailed structure of a general liquid crystal panel. As shown in FIG. 2, a plurality of scanning (gate) lines 14 and a plurality of data lines 16, crossing the gate lines 14, are formed in a matrix configuration on a first substrate 21. At each cross over portion, a pixel electrode 26 and a thin film transistor (TFT) 13 are formed. On a second substrate 22, which faces the first substrate 21, a common electrode 24 and a color filter 23 are formed. Between the first and second substrates 21 and 22, liquid crystal 25 is injected. The common electrode 24 and the pixel electrode 26 separated therefrom by the liquid crystal 25 function as a pixel of the liquid crystal display. On the outer surfaces of the first and second substrates 21 and 22, polarizers 20 are formed to selectively transmit light depending on the arrangement of the liquid crystal 25.

FIG. 3 shows the structure of a thin film transistor usable in a liquid crystal display. As shown in FIG. 3, the thin film transistor includes a gate electrode 30 formed on a substrate 29, an insulating layer 31 formed over the substrate 29, a semiconductor layer 34 formed on the insulating layer 31 over the gate electrode 30, first and second impurity doped semiconductor layer 36a and 36b formed on a first and second side of the semiconductor layer 34, respectively, a source electrode 32 and a drain electrode 33 formed on the first and second impurity doped semiconductor layers 36a and 36b, respectively, second insulating layer 35 formed over the substrate 29, and a pixel electrode 26 formed on a portion of the second insulating layer 29 and contacting the drain electrode 33 via a contact hole in the second insulating layer 35. The gate electrode 30 is formed using a metal such as aluminum, chromium, and molybdenum. The source and drain electrodes 32 and 33 are formed using a metal such as aluminum, chromium, or molybdenum. The gate electrode 30 is connected to the gate line 14 as shown in FIG. 2. The source electrode 32 is connected to the data line 16 shown in FIG. 2, and the drain electrode 33 is connected to the pixel electrode 26. When a scanning pulse (a scanning voltage) is applied to the gate electrode 30 of the TFT through the gate line 14, a data signal on the data line 16 is transmitted from the source electrode 32 to the drain electrode 33 through the semiconductor layer 34.

The data signal received by the source electrode 32 is applied to the pixel electrode 26 so as to establish a voltage (electric potential) difference between the pixel electrode 26 and the common electrode 24. Due to the induced voltage difference, the orientation of the liquid crystal molecules between the pixel electrode 26 and the common electrode 24 changes. Based on the change in orientation of the liquid crystal 25, the light transmittance of the pixel varies to establish a visual difference between the pixel without the data voltage input and the pixel with the data voltage input. Collectively, these pixels, having visual differences, function as a display mechanism for the liquid crystal display.

In the liquid crystal display shown in FIG. 2, the substrate 21, having the pixel electrode 26, is separated from the substrate 22, having the common electrode 24. That is, on the first substrate 21, the TFTs 13 and the pixel electrodes 26 are formed, whereas on the second substrate 20, the common electrode 24 is formed. During the process of forming the first substrate 21, high level static electricity, which can damage the TETs 13, is generated. In order to prevent damage to the TFTs 13 due to static electricity, conventionally a static electricity preventing circuit has been provided for each of the gate and data lines 14 and 16, and one common short line connecting the static electricity preventing circuits is provided on the first substrate 21.

Also, as shown in FIG. 4, in the process of manufacturing the first substrate, a data short bar 42 and a gate short bar 41 are provided to test the operation of the TFT. The data short bar 42 and the gate short bar 41 are shorted through an external short bar 40. The data short bar 42 and the gate short bar 41 are used to transmit a test signal to each of the TFTs 13 formed on the first substrate 21, and test the operation of the TFTs 13. To test the operation of the TFTs 13, a voltage is applied to each of the gate and data short bars 41 and 42 to obtain an output voltage value from the TFTs 13 for determining whether the TFTs 13 are operating normally.

FIG. 5 shows a connection structure for a gate short bar, a data short bar, a gate line and a data line. As shown in FIG. 5, a gate short bar 50 is connected to a plurality of gate lines 55 and a data short bar 51 is connected to a plurality of data lines 56. The gate lines 55 and the data lines 56 are each connected to one end of a plurality of static electricity preventing devices 52. The static electricity preventing circuits 52 are also connected to a common short line 53. The common short line 53 surrounds the area of a substrate in which a plurality of TFTs 54 are formed, and is connected to the other end of the static electricity preventing circuits 52.

FIG. 6 shows, in detail, the circuitry of a static electricity preventing circuit 52. The static electricity preventing circuit 52 is formed of a plurality of transistors and can be incorporated into the thin film transistor array. Specifically, the gate and source of a first transistor 62 and the source of a third transistor 64 are connected to a first terminal 60 of the static electricity preventing circuit 52. The drain of the first transistor 60 is connected to the gate of the third transistor 64 and a source of the second transistor 63. The gate and the drain of the second transistor 63 and the drain of the third transistor 64 are connected to a second terminal 61.

The static electricity preventing circuit 52 prevents damage from occurring due to static electricity generated during the testing or manufacturing of the liquid crystal display panel. For example, when static electricity is generated at a portion of the gate line 55, the static electricity preventing circuit 52 connected to this gate line 55 prevents the TFT 54 from malfunctioning due to a voltage difference between this gate line 55 and neighboring gate lines 55. The static electricity preventing circuit 52 connected to the data line 56 prevents damage of the TFT 54 due to the voltage difference between this data line 56 and adjacent data lines 56 when static electricity is generated at a portion of the data line 56. Further, since the gate lines 55 and the data lines 56 are all connected to the common short line 53, static electricity generated from any portion of the TFT array can be eliminated.

As shown in FIG. 6, when high voltage due to static electricity is applied to a first terminal 60 of the static electricity preventing circuit 52, a first transistor 62 is turned on so as to turn on a third transistor 64. This establishes a common electric potential between the first terminal 60 and a second terminal 61. Furthermore, when high voltage due to static electricity is applied to the second terminal 61, the second transistor 63 is turned on so as to turn on the third transistor 64. Therefore, an equal electric potential is established between the first and second terminals 60 and 61. Since no static electricity is applied to either the first terminal 60 or the second terminal 61 under the proper operation of the liquid crystal display, the first and second transistors 62 and 63 are not activated. By eliminating all but a minute current flow therebetween, the first and second terminals are maintained insulated from each other.

The first, second, and third transistors 62–64 of the static electricity preventing circuit 52 are formed such that a current flows between the first and second terminals 60 and 61 only when a high voltage, much greater than the drive voltages applied to the gate and data lines 55 and 56, is applied to one of the first and second terminals 60 and 61. Therefore, when a drive voltage is applied to the gate or drive lines 55 or 56, the static electricity preventing circuits 52 do not become conductive, and proper testing or operation of the TFTs 54 occurs. When a high static electricity voltage is applied to a gate or data line 55 or 56, however, the corresponding static electricity preventing circuit becomes conductive, and the electric potential difference between conductive lines (e.g., gate and data lines 55 and 56) is eliminated. This prevents the TFTs 54 from being damaged.

That is, when a voltage is applied to the gate and data lines 55 and 56 for testing the operation of the TFTs 54, the static electricity preventing circuits 52 function as insulators so that the gate lines 55 are not affected by the data lines 56. On the other hand, when static electricity is applied to the gate lines 55 or data lines 56, since the static electricity preventing circuits 52 maintain equal electric potential for the gate or data lines 55 or 56, the TFTs 54 formed on the first substrate are protected.

Further, to securely maintain the voltage difference between the common short line 53 and the gate or data lines 55 or 56, a predetermined voltage is applied to the common short line 53.

While each static electricity preventing circuit 52 in the convention liquid crystal display panel functions as an insulating element during the testing of the TFTs 54, the static electricity preventing circuit 52 adds resistance to the testing circuits 50 and 51. This reduces the effectiveness of the device as a testing circuit. Further, due to the voltage difference at the end portions of the static electricity preventing circuit 52, leakage current is generated which deteriorates the picture quality of the liquid crystal display. That is, although the static electricity preventing circuit 52 functions as an insulator due to its high resistance, a very small amount of electricity is still transmitted through the static electricity preventing circuit 52. Therefore, when a voltage is applied to the gate or data lines 55 or 56 for testing the TFT 54, a portion of the current leaks and accurate testing cannot be performed.

For example, when a scanning voltage is applied to the gate line 55 for operating the TFT 54, a portion of the current generated due to the scanning voltage is transmitted to the common short line 53 through the static electricity preventing circuit 52. This current transmitted to the common short line 53 adversely affects the data lines 56 connected thereto by the other static electricity preventing circuits 52. The data signal applied to the data lines 56 also adversely affects the gate lines 55 via the static electricity preventing circuits 52 and the common short line 53. As a result, accurate testing of the TFTs 54 is not performed.

In order to enhance the testability of the TFTs, it has been suggested to form a first static electricity preventing circuit connected to a first short line and a second static electricity preventing circuit connected to a second short line; where the first short line is connected to the gate lines and the second short line is connected to the data lines. (The common short line is separated into the first and second short lines) However, since there exists a different electric potential between the voltage applied to the gate line and the voltage applied to the data line, an electric potential difference exists between the first short line and the second short line. Consequently, the operation of the static electricity preventing circuit is not reliable. Furthermore, since the conventional liquid crystal display requires the application of a predetermined voltage to the common short line or the first and second short lines, an additional driving circuit is required.

SUMMARY OF THE INVENTION

Accordingly, the present invention is directed to an improved liquid crystal panel and a method of forming the same which overcomes the above and other problems and disadvantages of the conventional devices.

Another object of the present invention is to provide a liquid crystal display panel and method of forming the same which enhances the testability of the TFTs in the liquid crystal display and is reliable.

A further object of the present invention is to provide a liquid crystal display panel and method of forming the same which enhances the testability of the TFTs in the liquid crystal display without using an additional driving circuit.

These and other objects are achieved by providing a thin film transistor array, comprising: a substrate; a plurality of scanning lines formed in a first direction on the substrate; a plurality of data lines formed in a second direction on the substrate such that each data line crosses the scanning lines; a pixel electrode formed at each cross-over portion between the scanning and data lines; a thin film transistor formed at each cross-over portion, and each thin film transistor having an input electrode connected to one of the data lines, an output electrode connected to the pixel electrode formed at the cross-over portion, and a control electrode connected to one of the scanning lines; a gate short line receiving a scanning voltage which is applied to the scanning lines; a data short line receiving a first voltage; a first static electricity prevention circuit associated with each scanning line, each first static electricity prevention circuit being connected between the associated scanning line and the gate short line; and a second static electricity prevention circuit associated with each data line, and each second static electricity prevention circuit being connected between the associated data line and the data short line.

These and other objects are further achieved by providing a thin film transistor array, comprising: a substrate; a plurality of scanning lines formed in a first direction on the substrate; a plurality of data lines formed in a second direction on the substrate such that each data line crosses the scanning lines; a pixel electrode formed at each cross-over portion between the scanning and data lines; a thin film transistor formed at each cross-over portion, and each thin film transistor having an input electrode connected to one of the data lines, an output electrode connected to the pixel electrode formed at the cross-over portion, and a control electrode connected to one of the scanning lines; a gate short line receiving a first voltage; a data short line receiving a common voltage which is applied to a common electrode of a liquid crystal display to which the array belongs; a first static electricity prevention circuit associated with each scanning line, each first static electricity prevention circuit being connected between the associated scanning line and the gate short line; and a second static electricity prevention circuit associated with each data line, and each second static electricity prevention circuit being connected between the associated data line and the data short line.

These and other objects are also achieved by providing a thin film transistor array, comprising: a substrate; a plurality of scanning lines formed in a first direction on the substrate; a plurality of data lines formed in a second direction on the substrate such that each data line crosses the scanning lines; a pixel electrode formed at each cross-over portion between the scanning and data lines; a thin film transistor formed at each cross-over portion, and each thin film transistor having an input electrode connected to one of the data lines, an output electrode connected to the pixel electrode formed at the cross-over portion, and a control electrode connected to one of the scanning lines; a gate short line receiving a first voltage; a data short line receiving a second voltage; a first static electricity prevention circuit associated with each scanning line, each first static electricity prevention circuit being connected between the associated scanning line and the gate short line; a second static electricity prevention circuit associated with each data line, and each second static electricity prevention circuit being connected between the associated data line and the data short line; and a third static electricity prevention circuit connected between the gate short line and the data short line.

These and other objects are still further achieved by providing a method of operating a liquid crystal display panel having a thin film transistor array including a substrate, a plurality of scanning lines formed in a first direction on the substrate, a plurality of data lines formed in a second direction on the substrate such that each data line crosses the scanning lines, a pixel electrode formed at each cross-over portion between the scanning and data lines, a thin film transistor formed at each cross-over portion, and each thin film transistor having an input electrode connected to one of the data lines, an output electrode connected to the pixel electrode formed at the cross-over portion, and a control electrode connected to one of the scanning lines, the array further including a gate short line, a data short line, a first static electricity prevention circuit associated with each scanning line, each first static electricity prevention circuit being connected between the associated scanning line and the gate short line, and a second static electricity prevention circuit associated with each data line, and each second static electricity prevention circuit being connected between the associated data line and the data short lLne, the method comprising: (a) applying a scanning voltage, which is applied to the scanning lines, to the gate short line; and (b) applying a first voltage to the data short line.

These and other objects are additionally achieved by providing a method of operating a liquid crystal display panel having a thin film transistor array including a substrate, a plurality of scanning lines formed in a first direction on the substrate, a plurality of data lines formed in a second direction on the substrate such that each data line crosses the scanning lines, a pixel electrode formed at each cross-over portion between the scanning and data lines, a thin film transistor formed at each cross-over portion, and each thin film transistor having an input electrode connected to one of the data lines, an output electrode connected to the pixel electrode formed at the cross-over portion, and a control electrode connected to one of the scanning lines, the array further including a gate short line, a data short line, a first static electricity prevention circuit associated with each scanning line, each first static electricity prevention circuit being connected between the associated scanning line and the gate short line, and a second static electricity prevention circuit associated with each data line, and each second static electricity prevention circuit being connected between the associated data line and the data short line, the method comprising: (a) applying a first voltage to the gate short line; and (b) applying a common voltage which is applied to a common electrode of a liquid crystal display to which the array belongs.

These and other objects are further achieved by providing a method of operating a liquid crystal display panel having a thin film transistor array including a substrate, a plurality of scanning lines formed in a first direction on the substrate, a plurality of data lines formed in a second direction on the substrate such that each data line crosses the scanning liens, a pixel electrode formed at each cross-over portion between the scanning and data lines, a thin film transistor formed at each cross-over portion, and each thin film transistor having an input electrode connected to one of the data lines, an output electrode connected to the pixel electrode formed at the cross-over portion, and a control electrode connected to one of the scanning lines, the array further including a gate short line, a data short line, a first static electricity prevention circuit associated with each scanning line, each first static electricity prevention circuit being connected between the associated scanning line and the gate short line, a second static electricity prevention circuit associated with each data line, and each second static electricity prevention circuit being connected between the associated data line and the data short line, and a third static electricity prevention circuit connected between the gate short line and the data short line, the method comprising: (a) applying a first voltage to the gate short line; and (b) applying a second voltage to the data short line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 7:
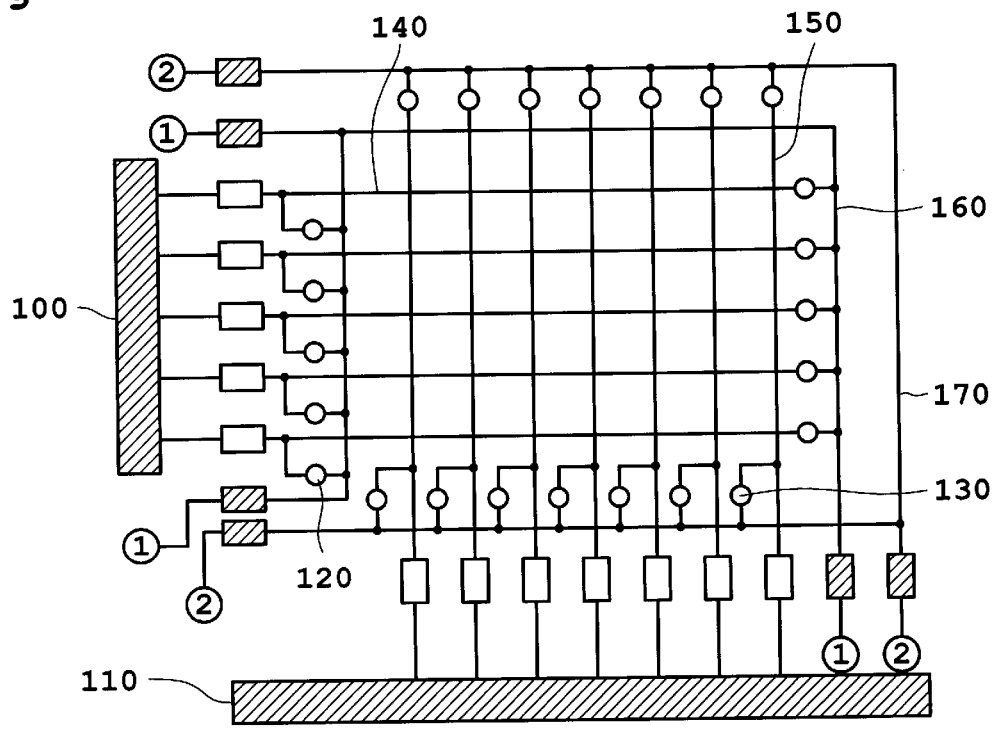
FIG. 7 shows a liquid crystal panel having a separate gate short line and data short line in a thin film transistor array according to one embodiment of the present invention.

Referring now in detail to the drawings for the purposes of illustrating preferred embodiments of the present invention, FIG. 7 illustrates a TFT array including gate lines 140 and data lines 150 formed in a matrix with a TFT (not shown) and pixel electrode (not shown) formed at each cross-over portion of the gate and data lines 140 and 150. On one side of the gate lines 140, a gate short bar 100 is formed. On one side of the data lines 150, a data short bar 110 is formed.

Figure 1:
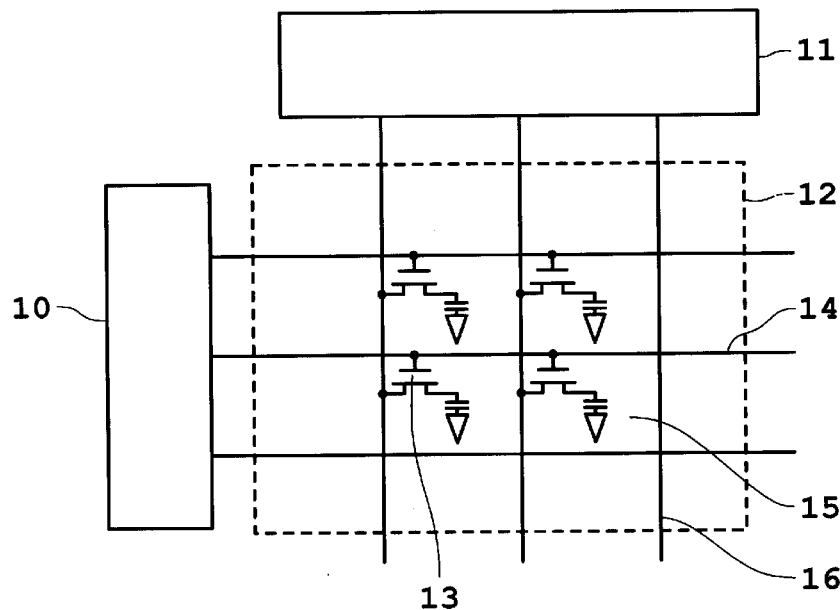
FIG. 1 shows the structure of a conventional liquid crystal display.
Figure 2:
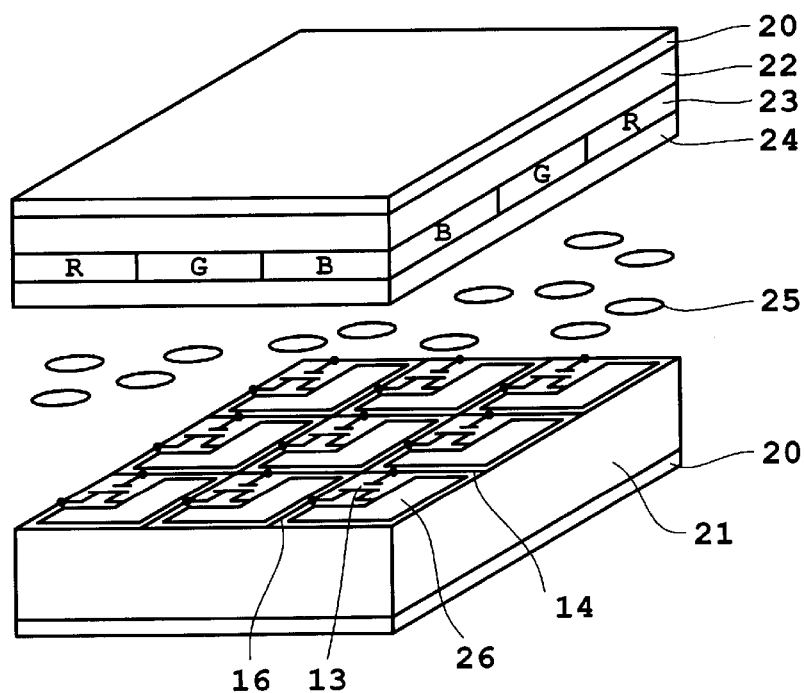
FIG. 2 shows the first and second substrates of a conventional liquid crystal display.
Figure 3:
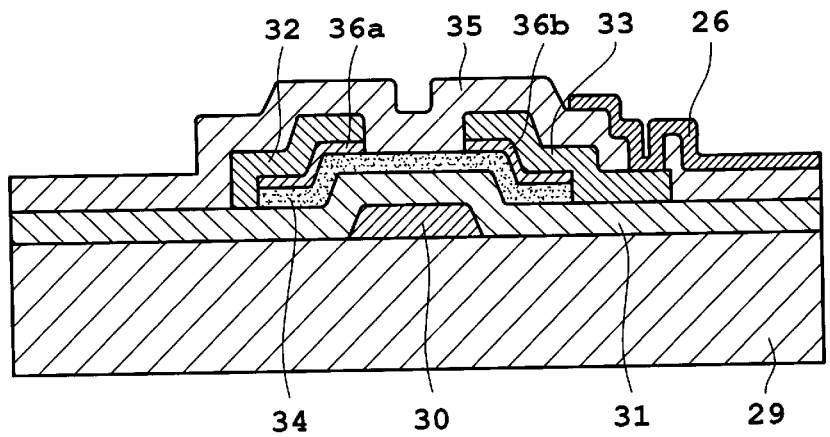
FIG. 3 shows the structure of a conventional TFT.
Figure 4:
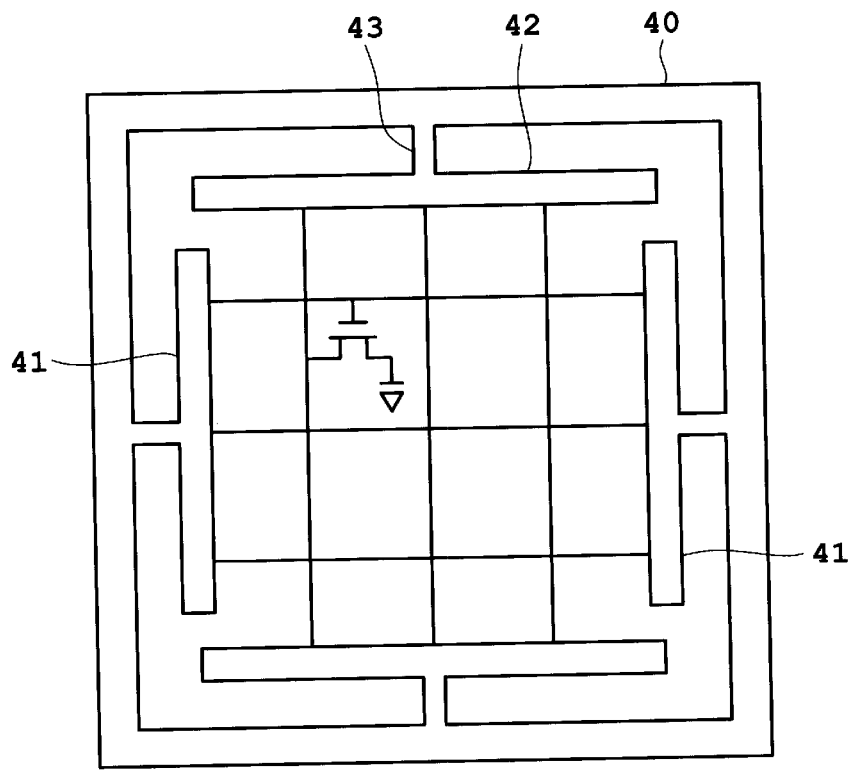
FIG. 4 shows a data short bar and a gate short bar formed on the first substrate of a conventional liquid crystal panel.
Figure 5:
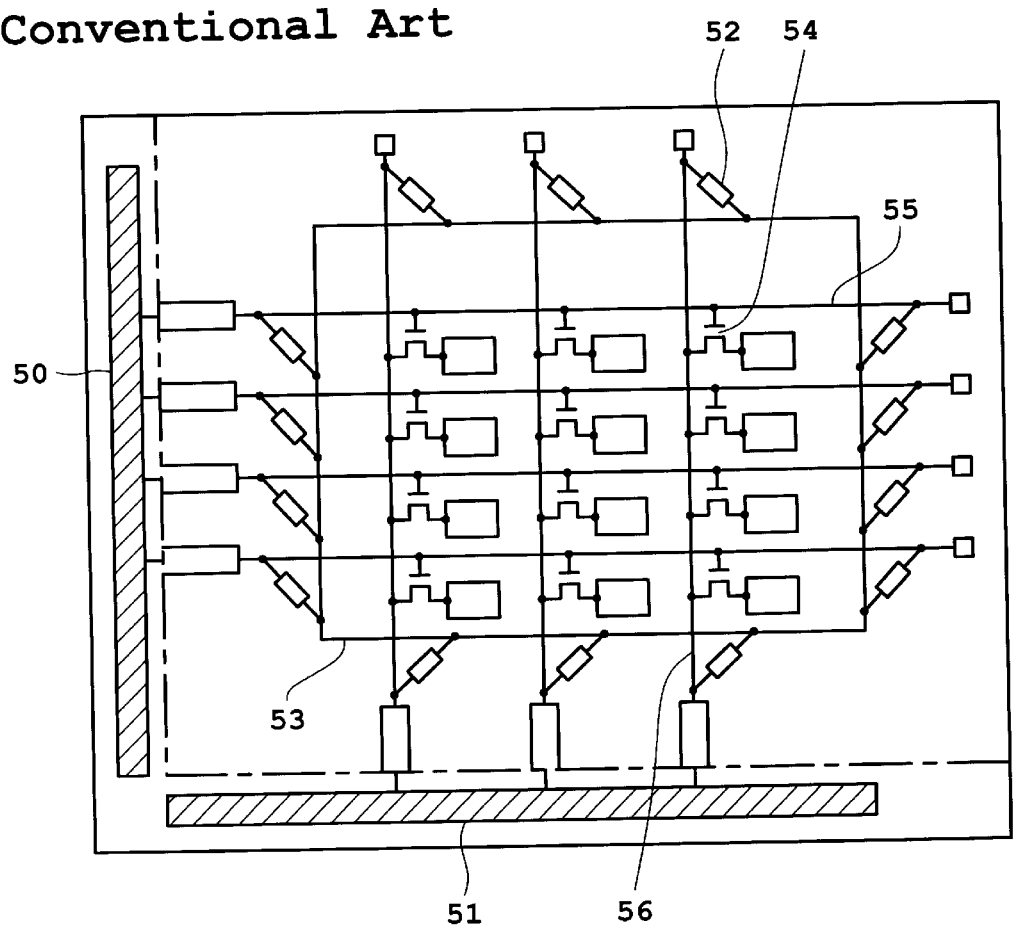
FIG. 5 shows a conventional liquid crystal panel including a gate short bar, a data short bar, a static electricity preventing circuit, and a common short line.
Figure 6:
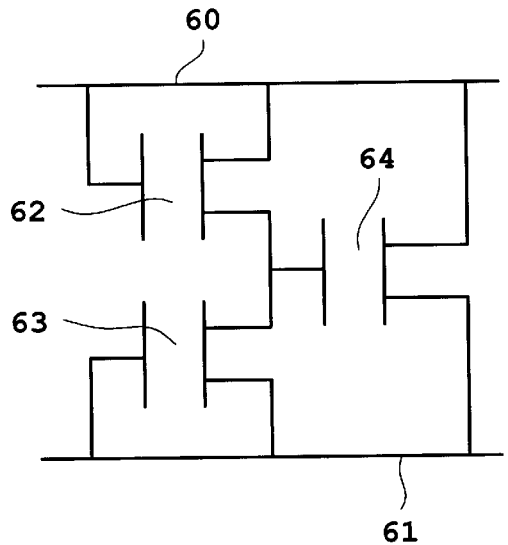
FIG. 6 shows the circuitry of a conventional static electricity preventing circuit.

A scanning or gate line short line 160 is connected to the gate lines 140 through a plurality of first static electricity preventing circuit 120. A data short line 170 is connected to the data lines 150 through a plurality of second static electricity preventing circuit 130. The first and second static electricity preventing circuits 120 and 130 have the same structure, therefore, the first and second static electricity preventing circuits 120 and 130 can be formed by using the same manufacturing process. Also, the first and second static preventing circuits 120 and 130 can have the same circuitry as the conventional static electricity preventing circuits shown in FIG. 6.

A low level voltage $V_{gl}$ is applied to the gate short line 160 to stabilize the operation of the first static electricity preventing circuits 120. The low level voltage $V_{gl}$ is the same as the low level voltage of the scanning voltage applied to the gate lines 140 to turn off the TFTs. A voltage $V_{com}$, which is the same voltage applied to a common electrode of the liquid crystal display, is applied to the data short line 170 to stabilize the operation of the second static electricity preventing circuits 130. The application of voltages to the gate and data short lines 160 and 170 in this manner simplifies the driving circuit of the liquid crystal panel by eliminating the need for a separate voltage input terminal connected to a common short line as in the conventional static electricity preventing device.

The reason for applying the low level voltage $V_{gl}$ to the gate short line 160 will now be described. In displaying a frame of a picture using a liquid crystal display panel, a high level voltage $V_{gh}$ is applied to each of the gate lines 140 for a predetermined time period, and then a low level voltage $V_{gl}$ is applied to the gate lines 140 for the remainder of the frame period. If the gate short line 160 were grounded, once a voltage is applied to one of the scanning lines 140, a voltage difference of at least $V_{gl}$ would occur between the terminals of the static electricity preventing circuits 120. As a result, the insulating effect of the static electricity preventing circuits 120 would become unstable. If any irregular signal variation (such as noise) occurs in $V_{gl}$, or if an electric potential difference higher than $V_{gl}$ is generated between the terminals of the static electricity preventing circuit 120, the insulating condition of the static electricity preventing circuits 120 would be destroyed such that the TFTs connected to the affected gate lines 140 would be adversely affected.

However, by applying a voltage equivalent to the scanning voltage $V_{gl}$ to the gate short line 160, there is no voltage difference between terminals of the static electricity preventing circuits 120 during the majority of the frame period. This, therefore, stably maintains the insulating condition of the static electricity preventing circuits 120.

The reason for applying a voltage $V_{com}$ to the data short line 170 will now be described in detail. The electric potential difference generated between the common electrode and the pixel electrode of a liquid crystal display causes a variation in the light transmittance of the liquid crystal. The common voltage $V_{com}$ applied to the common electrode always has a predetermined period and voltage; however, the pixel voltage applied to the pixel electrode varies depending on the image signal. The difference between the pixel voltage and the common voltage allows the light transmittance of the liquid crystal to vary. Because the data short line 170 requires the application of predetermined voltage to function properly, the pixel voltage cannot be applied to the data short line 170.

The common voltage $V_{com}$, however, does have a predetermined voltage. By using the common voltage $V_{com}$ as the voltage applied to the data short line 170, the present invention eliminates the need for a separate voltage input circuit. Therefore, the common voltage $V_{com}$ applied to the common electrode is applied to the data short line 170 to stabilize the insulating condition of the second static electricity preventing circuit 130.

In the first embodiment of the present invention, the gate short line 160 and the data short line 170 are isolated from each other. This electrically isolates the gate lines 140 and data lines 150. By separating the gate lines 140 and the data lines 150, there is a likelihood that the electric potential difference between a gate line 140 and a data line 150 can become quite large due to static electricity. The second embodiment of the present invention shown in FIG. 8 prevents this situation from occurring.

Figure 8:
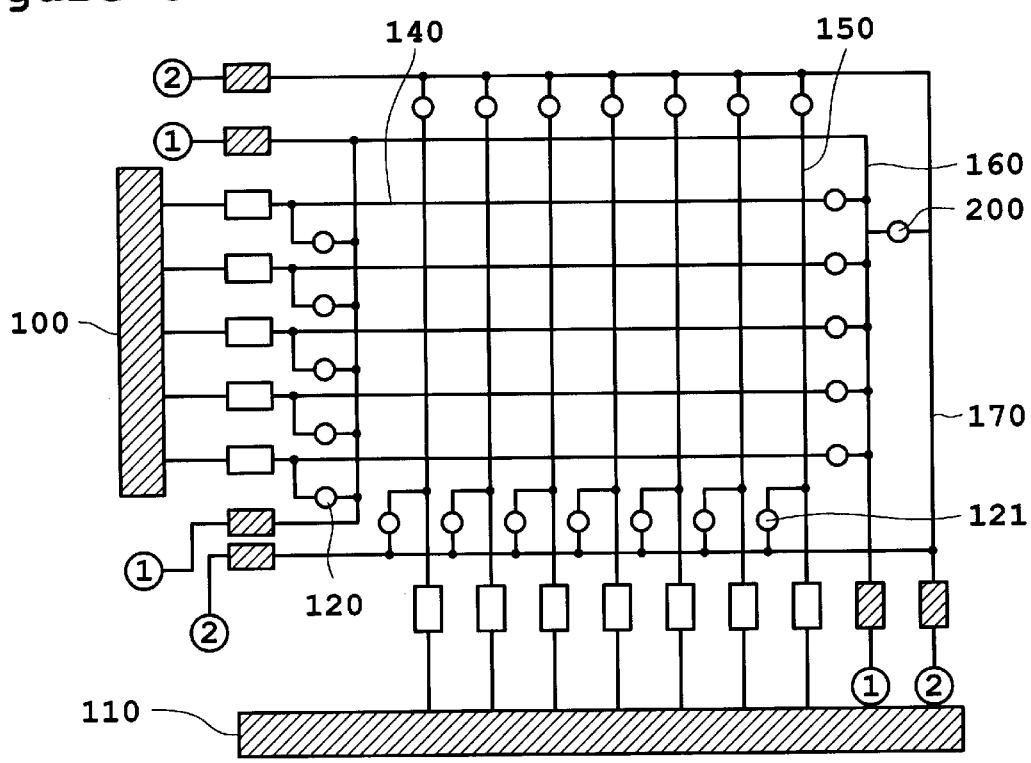
FIG. 8 shows a static electricity preventing circuit connected between a gate short line and data short line according to another embodiment of the present invention.

The second embodiment of the present invention shown in FIG. 8 has the same structure as the first embodiment shown in FIG. 7 except for the addition of a third static electricity preventing circuit 200 connected between the gate short line 160 and the data short line 170. When the electric potential between the gate short line 160 and the data short line 170 becomes large, the third static electricity preventing circuit 200 conducts and eliminates the potential difference.

Consequently, a large electric potential difference will not exist between the gate lines 140 and the data lines 150.

ADVANTAGES OF THE PRESENT INVENTION

In the present invention, during the process of first manufacturing the liquid crystal display panel, a separate gate short line, connected to the gate lines by a plurality of static electricity preventing circuits, and a data short line, connected to the data lines by a second plurality of static electricity circuits, are formed. A different voltage is applied to each of the gate and data short lines to stabilize the static electricity preventing circuits for protecting the TFTs of the liquid crystal display. Particularly, a low level voltage of a scanning voltage is applied to the gate short line to stabilize the static electricity preventing circuits connected between the gate short line and the gate lines. A common voltage, applied to the common electrode of the liquid crystal display panel, is applied to the data short line to stabilize the static electricity preventing circuits connected between the data short line and the data line.

Further, since the gate short line is isolated from the data short line, any leakage current due to the voltage applied to the gate line for testing the TFTs is prevented. As a result, an improved and more accurate testing device compared to the conventional testing devices is formed.

Moreover, by connecting a scanning voltage input terminal to the gate short line and a common voltage input terminal to the data short line, a separate voltage driving circuit required in the conventional art is not necessary. By eliminating the voltage difference between the gate line and gate short line and between the data line and data short line, the liquid crystal panel is more effectively protected from static electricity.

In the present invention, the gate and data short lines can be formed during manufacture of the TFTs on the first substrate so that the number of processing steps is not increased. Furthermore, by forming a separate static electricity preventing circuit between the gate short line and the data short line, any static electricity arising between the gate short line and the data short line is eliminated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim the following:

1. A thin film transistor array, comprising:

a substrate;

a plurality of scanning lines formed in a first direction on the substrate;

a plurality of data lines formed in a second direction on the substrate such that each data line crosses the scanning lines;

a pixel electrode formed at each cross-over portion between the scanning and data lines;

a thin film transistor formed at each cross-over portion, and each thin film transistor having an input electrode connected to one of the data lines, an output electrode connected to the pixel electrode formed at the cross-over portion, and a control electrode connected to one of the scanning lines;

a scanning short line connected to the gate lines;

a data short line connected to the data lines;

a first terminal connected with the scanning short line, wherein a first voltage is applied to the first terminal;

a second terminal connected with the data short line, wherein a second voltage is applied to the second terminal;

a first static electricity prevention circuit associated with each scanning line, each first static electricity prevention circuit being connected between the associated scanning line and the gate short line; and a second static electricity prevention circuit associated with each data line, and each second static electricity prevention circuit being connected between the associated data line and the data short line.

2. The array of claim 1, wherein the first voltage is a minimum level voltage of a scanning voltage applied to the scanning lines.

3. The array of claim 1, wherein the second voltage is a common voltage, which is applied to a common electrode of a liquid crystal display to which the array belongs.

4. The array of claim 1, wherein the gate short line is formed outside a region of the substrate on which the thin film transistors are formed.

5. The array of claim 4, wherein the gate short line is separated from the data line.

6. The array of claim 5, further comprising:

a non-linear device connecting the gate short line and th e data short line.

7. The array of claim 5, further comprising:

a third static electricity prevention circuit connected between the gate short line and the data short line.

8. The array of claim 1, wherein the data short line is formed outside a region of the substrate on which the thin film transistors are formed.

9. The array of claim 8, wherein the gate short line is separate from the data short line.

10. The array of claim 9, further comprising:

a non-linear device connecting the gate short line and the data short line.

11. The array of claim 9, further comprising:

a third static electricity prevention circuit connected between the gate short line and the data short line.

12. The array of claim 1, wherein the gate short line is separated from the data short line.

13. The array of claim 12, further comprising:

a non-linear device connecting the gate short line and the data short line.

14. The array of claim 12, further comprising:

a third static electricity prevention circuit connected between the gate short line and the data short line.

15. The array of claim 1, wherein the first and second static electricity prevention circuits have a same structure.

16. The array of claim 15, wherein the first static electricity prevention circuits include a non-linear device.

17. The array of claim 16, wherein the non-linear device comprises:

a first transistor having a first gate, a first source, and a first drain, the first source being connected to the gate short line;

a second transistor having a second gate, a second source and a second drain, the second source connected to the first drain, and the second gate and the second drain connected to one of the scanning lines; and a third transistor having a third gate, a third source and a third drain, the third gate connected to the first drain and the second source, the third source connected to the gate short line, and the third drain connected to the one of the scanning lines.

18. The array of claim 15, wherein the second static electricity prevention circuits include a non-linear device.

19. The array of claim 18, wherein the non-linear device comprises:
- a first transistor having a first gate, a first source, and a first drain, the first source being connected to the data short line;
- a second transistor having a second gate, a second source and a second drain, the second source connected to the first drain, and the second gate and the second drain connected to one of the data lines; and
- a third transistor having a third gate, a third source and a third drain, the third gate connected to the first drain and the second source, the third source connected to the data short line, and the third drain connected to the one of the data lines.

20. The array of claim 1, wherein the first static electricity prevention circuits include a non-linear device.

21. The array of claim 20, wherein the non-linear device comprises:
- a first transistor having a first gate, a first source, and a first drain, the first source being connected to the gate short line;
- a second transistor having a second gate, a second source and a second drain, the second source connected to the first drain, and the second gate and the second drain connected to one of the scanning lines; and
- a third transistor having a third gate, a third source and a third drain, the third gate connected to the first drain and the second source, the third source connected to the gate short line, and the third drain connected to the one of the scanning lines.

22. The array of claim 1, wherein the second static electricity prevention circuits include a non-linear device.

23. The array of claim 22, wherein the non-linear device comprises:
- a first transistor having a first gate, a first source, and a first drain, the first source being connected to the data short line;
- a second transistor having a second gate, a second source and a second drain, the second source connected to the first drain, and the second gate and the second drain connected to one of the data lines; and
- a third transistor having a third gate, a third source and a third drain, the third gate connected to the first drain and the second source, the third source connected to the data short line, and the third drain connected to the one of the data lines.

24. A thin film transistor array, comprising:
- a substrate;
- a plurality of scanning lines formed in a first direction on the substrate;
- a plurality of data lines formed in a second direction on the substrate such that each data line crosses the scanning lines;
- a pixel electrode formed at each cross-over portion between the scanning and data lines;
- a thin film transistor formed at each cross-over portion, and each thin film transistor having an input electrode connected to one of the data lines, an output electrode connected to the pixel electrode formed at the cross-over portion, and a control electrode connected to one of the scanning lines;
- a gate short line receiving a first voltage;
- a data short line receiving a second voltage;
- a first static electricity prevention circuit associated with each scanning line, each first static electricity prevention circuit being connected between the associated scanning line and the gate short line;
- a second static electricity prevention circuit associated with each data line, and each second static electricity prevention circuit being connected between the associated data line and the data short line; and
- a third static electricity prevention circuit connected between the gate short line and the data short line.

25. The array of claim 24, wherein the gate short line receives a minimum level voltage of a scanning voltage applied to the scanning lines as the first voltage; and
- the data short line receives a common voltage, which is applied to a common electrode of a liquid crystal display to which the array belongs, as the second voltage.

26. A method of operating a liquid crystal display panel having a thin film array including a substrate, a plurality of scanning lines formed in a first direction on the substrate, a plurality of data lines formed in a second direction on the substrate such that each data line crosses the scanning lines, a pixel electrode formed at each cross-over portion between the scanning and data lines, a thin film transistor formed at each cross-over portion, and each thin film transistor having an input electrode connected to one of the data lines, an output electrode connected to the pixel electrode formed at the cross-over portion, and a control electrode connected to one of the scanning lines, the array further including a gate short line, a data short line, a first static electricity prevention circuit associated with each scanning line, each first static electricity prevention circuit being connected between the associated scanning line and the gate short line, and a second static electricity prevention circuit associated with each data line, and each second static electricity prevention circuit being connected between the associated data line and the data short line, the method comprising:
- (a) applying a first voltage, which is applied to the scanning lines, to the gate short line; and
- (b) applying a second voltage to the data short line.

27. The method of claim 26, wherein the step (b) applies a common voltage, which is applied to a common electrode of a liquid crystal display to which the array belongs, as the second voltage.

28. The method of claim 27, wherein the step (a) applies a low level voltage of the scanning voltage applied to the scanning lines as the first voltage.

29. The method of claim 26, wherein the step (a) applies a low voltage of a scanning voltage applied to the scanning lines as the first voltage.

30. A method of operating a liquid crystal display panel having a thin film array including a substrate, a plurality of scanning lines formed in a first direction on the substrate, a plurality of data lines formed in a second direction on the substrate such that each data line crosses the scanning lines, a pixel electrode formed at each cross-over portion between the scanning and data lines, a thin film transistor formed at each cross-over portion, and each thin film transistor having an input electrode connected to one of the data lines, an output electrode connected to the pixel electrode formed at the cross-over portion, and a control electrode connected to one of the scanning lines, the array further including a gate short line, a data short line, a first static electricity prevention circuit associated with each scanning line, each first static electricity prevention circuit being connected between the associated scanning line and the gate short line, and a second static electricity prevention circuit associated with each data line, and each second static electricity prevention circuit being connected between the associated data line and the data short line, the method comprising:

(a) applying a first voltage to the gate short line; and (b) applying a common voltage which is applied to a common electrode of a liquid crystal display to which the array belongs.

31. A method of operating a liquid crystal display panel having a thin film array including a substrate, a plurality of scanning lines formed in a first direction on the substrate, a plurality of data lines formed in a second direction on the substrate such that each data line crosses the scanning lines, a pixel electrode formed at each cross-over portion between the scanning and data lines, a thin film transistor formed at each cross-over portion, and each thin film transistor having an input electrode connected to one of the data lines, an output electrode connected to the pixel electrode formed at the cross-over portion, and a control electrode connected to one of the scanning lines, the array further including a gate short line, a data short line, a first static electricity prevention circuit associated with each scanning line, each first static electricity prevention circuit being connected between the associated scanning line and the gate short line, a second static electricity prevention circuit associated with each data line, and each second static electricity prevention circuit being connected between the associated data line and the data short line, and a third static electricity prevention circuit connected between the gate short line and the data short line, the method comprising:

(a) applying a first voltage to the gate short line; and (b) applying a second voltage to the data short line.

32. The method of claim 31, wherein the step (b) applies a common voltage, which is applied to a common electrode of a liquid crystal display to which the array belongs, as the second voltage.

33. The method of claim 32, wherein the step (a) applies a low level voltage of a scanning voltage applied to the scanning lines as the first voltage.

34. The method of claim 31, wherein the step (a) applies a low level voltage of a scanning voltage applied to the scanning lines as the first voltage.

* * * * *